United States Patent [19]

Wunderlich

[11] Patent Number: 4,886,416
[45] Date of Patent: Dec. 12, 1989

[54] EXHAUST-GAS TURBOCHARGER FOR AN INTERNAL-COMBUSTION ENGINE

[75] Inventor: Klaus Wunderlich, Waiblingen, Fed. Rep. of Germany

[73] Assignee: Daimler-Benz Aktiengesellschaft, Stuttgart, Fed. Rep. of Germany

[21] Appl. No.: 256,325

[22] Filed: Oct. 11, 1988

[30] Foreign Application Priority Data

Oct. 10, 1987 [DE] Fed. Rep. of Germany ....... 3734386

[51] Int. Cl.⁴ ............................................. F01D 17/14
[52] U.S. Cl. ....................................... 415/158; 60/602
[58] Field of Search ................. 60/600, 601, 602, 603; 415/157, 158

[56] References Cited

U.S. PATENT DOCUMENTS

| | | |
|---|---|---|
| 2,290,770 | 7/1942 | Schumann ................. 415/145 UX |
| 3,941,498 | 3/1976 | Duckworth et al. ........... 415/158 X |
| 4,776,168 | 10/1988 | Woollenweber ................. 60/602 |

FOREIGN PATENT DOCUMENTS

| | | | |
|---|---|---|---|
| 538960 | 11/1931 | Fed. Rep. of Germany | ...... 415/158 |
| 2633587 | 2/1978 | Fed. Rep. of Germany | ........ 60/602 |
| 3143606 | 5/1983 | Fed. Rep. of Germany | . |

Primary Examiner—Michael Koczo

[57] ABSTRACT

An exhaust-gas turbocharger for an internal-combustion engine is described, its turbine having a double flow housing with two channels for supplying the exhaust gases to the turbine wheel, of which on channel can be closed off as a function of a variable operating parameter by means of a sliding sleeve which is mounted in the housing so as to be axially displaceable by means of a control device. To ensure a clearly defined relationship between the adjustment of the sliding sleeve and the input variables and to create a heat-resistant control device, the sliding sleeve is connected to an axially fixed and circumferentially rotable driving ring via a positive sliding fit driving the sliding sleeve in the circumferential direction, a slot pin fixed to the housing engaging into an oblique helical groove in the sliding sleeve, and a shaft engaging on the driving ring via a positive connection and being guided radially out of the housing via a bearing in the latter.

14 Claims, 1 Drawing Sheet

EXHAUST-GAS TURBOCHARGER FOR AN INTERNAL-COMBUSTION ENGINE

BACKGROUND AND SUMMARY OF THE INVENTION

The invention relates to an exhaust-gas turbo-charger for an internal-combustion engine. More particularly the invention relates to an adjusting device for the throughput of exhaust gas through the turbine of an exhaust-gas turbocharger for an internal-combustion engine, the turbine having a doubleflow housing with two channels for supplying the exhaust gases to the turbine wheel, of which one channel can be closed off as a function of a variable operating parameter by means of a sliding sleeve which is mounted in the housing so as to be axially displaceable by means of slot-like longitudinal grooves in the manner of a positive sliding fit.

An exhaust-gas turbocharger of this type is known from German Patent Specification 2,633,587. In this known exhaust-gas turbocharger, the sliding sleeve is controlled via an annular piston which is fastened to it and which, on the one hand, is loaded by a spring and, on the other hand, can be subjected to the charging air. In such a control of the sliding sleeve, a clearly defined relationship between the position of the sliding sleeve and the regulating variable is not possible because of the varying frictional forces and changing spring forces, so that the one exhaust-gas channel cannot be closed off by the sliding sleeve in the desired way. At the same time, the spring loading the annular piston will change its spring characteristic rapidly, above all because of the high temperatures acting on it. The functioning of the large surface annular gasket of the annular piston is also put at risk, where its sealing effect is concerned, because of the high temperature load and the warping caused thereby, so that an indeterminate counterpressure can build up in the rear space of the annular piston.

An object on which the invention is based is to create an exhaust-gas turbocharger for an internal-combustion engine, having a sliding sleeve whose adjustment travel can be related to the regulating variable in a clearly defined manner, the control device remaining fully operative independently of the sealing, despite the high temperatures occurring in the region of the exhaust-gas turbocharger.

According to the invention, this object is achieved by providing an arrangement wherein the sliding sleeve is connected to an axially fixed and circumferentially rotatable driving ring via driving pins which engage into the longitudinal grooves arranged in the sliding sleeve and which drive these in the circumferential direction, wherein a slot pin fixed to the housing engages into a helical groove in the sliding sleeve, and wherein a shaft engages on the driving ring via positive connection and is guided radially out of the housing via a bearing in the latter.

In the exhaust-gas turbocharger designed according to preferred embodiments of the invention, the regulating variable acts on the shaft in the cool region outside the exhaust-gas turbocharger, the purely mechanical connection between the shaft and the sliding sleeve ensuring a clearly defined relationship between the regulating variable and the position of the sliding sleeve. The adjusting force to be exerted is determined solely by internal frictional forces, since the sliding sleeve is subjected to the same static pressure on all sides. At the same time, frictional forces cannot influence the accuracy of the adjustment travel of the sliding sleeve, and there is no need for a spring subject to temperature influences. The shaft is the only part which has to be sealed off at its exit from the turbocharger housing, but this is possible relatively easily because of the small diameter of the shaft and the fact that there is no axial displacement.

In especially preferred embodiments of the invention the bearing, consisting especially of ceramic, is designed as a labyrinth gasket, into which a sealing ring is additionally inserted. In these embodiments, the shaft mounting and shaft sealing are combined in a space saving way, the sealing effect being highly reliable as a result of labyrinth and sealing ring, but also because of the small dimensions of the sealing location. Furthermore, because of small angles of adjustment of the shaft without any axial displacement, the sealing ring is subjected to only little mechanical load.

According to especially preferred embodiments the positive connection is designed as a bevel wheel which is equipped with a toothing over some of its circumference and is fastened to the shaft and which engages into a bevel-wheel toothing formed laterally on the driving ring. As a result of this design, a space-saving, exact and temperature-resistant positive connection between the shaft and the driving ring is made.

An advantageous feature of certain preferred embodiments includes an arrangement wherein the driving ring is mounted on a housing ring inserted in the exhaust gas channel downstream of the turbine wheel and forming the channel wall, and pins inserted into the driving ring engage into an outer encircling groove in the housing ring. This arrangement provides not only the possibility of a separate assembly of the control device as a whole, but also protection of the moving parts from direct exposure to exhaust gases. Furthermore, a reliable axial fixing of the driving ring in the housing ring, with movability in the circumferential direction, is achieved.

According to certain preferred embodiments an arrangement is provided wherein the pins inserted into the driving ring and projecting outwards therefrom engage as said driving pins into longitudinal grooves of the sliding sleeve, thus forming the sliding fit. Within this arrangement a substantial simplification in terms of construction is obtained because the pins connecting the driving ring to the housing ring are used at the same time as driving pins for the sliding sleeve.

According to an advantageous feature of certain preferred embodiments the driving ring is mounted on the housing ring by means of ceramic balls. This ensures the further improvement in the guidance of the driving ring and a reduction of friction.

According to especially preferred embodiments an arrangement is provided wherein adjacent to that end region of the housing ring located on the same side as the turbine wheel and connected firmly to the housing ring by means of retaining pins, a contour ring is provided which is matched to the outer edges of the turbine wheel and on which the sliding sleeve is additionally mounted. This arrangement makes it easier not only to match the shape of the inner wall of the channel closely to the form of the turbine wheel, but also to assemble the control device and improve the guidance of the sliding sleeve.

According to certain preferred embodiments the contour ring forms the inner track shoulder for the bearing balls on the turbine wheel side. As a result of these features the contour ring is fixed exactly in relation to the driving ring, and the design of the ball-bearing is simplified.

Other objects, advantages and novel features of the present invention will become apparent from the following detailed description of the invention when considered in conjunction with the accompanying drawings.

DETAILED DESCRIPTION OF THE DRAWINGS

Figure 1:
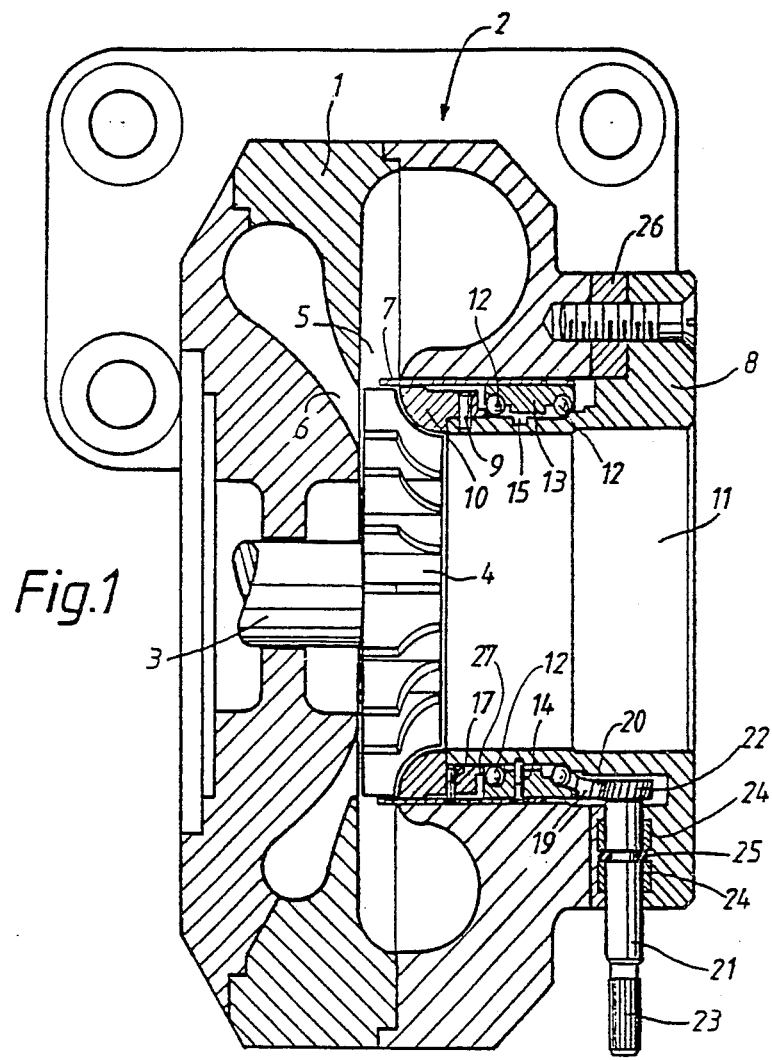
FIG. 1 is a schematic cross-sectional view through an exhaust-gas turbine with a sliding sleeve constructed according to a preferred embodiment of the invention.
Figure 2:
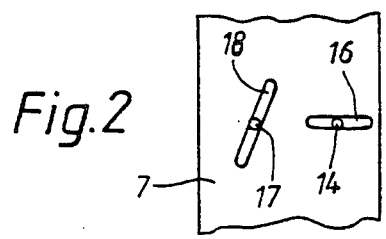
FIG. 2 schematically shows a partially laid out sliding sleeve of the FIG. 1 arrangement.

A turbine wheel 4 is mounted in a housing 1 of the exhaust-gas turbine 2 by means of a shaft 3 which at the same time drives a pump impeller (not shown) for conveying combustion air into an internal-combustion engine. This turbine wheel 4 can be subjected to exhaust gases via two spiral channels 5 and 6, specifically via one spiral channel 5 purely radially and via the other spiral channel 6 laterally with both radial and axial components. In order to feed the entire quantity of exhaust gas to the turbine wheel 4 via the spiral channel 6 under specific operating conditions, especially at low rotational speeds of the internal-combustion engine and in order to accelerate the turbine wheel 4, the spiral channel 5 subjecting the turbine wheel 4 to purely radially flow can be closed off by means of a sliding sleeve 7 immediately in front of the inflow into the turbine wheel 4.

The sliding sleeve 7 is mounted so as to be axially displaceable between the housing 1 and a housing ring 8 as well as a contour ring 10 connected to the latter by means of retaining pins 9. The housing ring 8 forms the wall of the channel 11 located downstream of the turbine wheel 4 and the contour ring 10 matches the outer form of the turbine wheel 4 immediately after the outflow of the spiral channel 5. Mounted on the housing ring 8 by means of ceramic balls 12, of which the row located on the same side as the turbine wheel is guided by a track shoulder 27 of the contour ring 10, is a driving ring 13. Ring 13 is additionally guided by driving pins 14, inserted into it and engaging into an outer circumferential groove 15 in the housing ring 8, in such a way that it can rotate on the housing ring 8, but is fixed in the axial direction. The driving pins 14 are guided further outwards into the sliding sleeve 7 and engage into longitudinal grooves 16 fashioned in the latter. Moreover, slot pins 17 inserted into the contour ring 10 engage into oblique helical grooves 18 which are fashioned in the sliding sleeve 7. Thus, when there is a circumferential movement of the driving ring 13, the sliding sleeve 7 is rotated as a result of the engagement of the driving pins 14 into the longitudinal grooves 16 and at the same time is displaced in the axial direction as a result of the engagement of the stationary slot pins 17 into the helical grooves 18, and the inflow of the spiral channel 5 is thereby opened to a greater or lesser extent. At the same time, the helical grooves 18 on the sliding sleeve 7 are placed so far downstream that they are covered by the contour ring 10 over the entire adjustment travel of the sliding sleeve.

The driving ring 13, on its end face turned away from the spiral channel 5, is equipped over some of its circumference with a bevel-wheel toothing 19, into which engages a corresponding toothing 20 of a bevel gearwheel 22 attached on a shaft 21 guided radially out of the housing 1. The shaft 21, at its outer end, is equipped with a positive connection 23, such as, for example, a serration, onto which an adjusting drive (not shown) can be attached in order to induce a rotary movement to the shaft 21.

The shaft 21 is mounted in two ceramic bearing rings 24, between which a sealing ring 25 is arranged. The mounting acts in the same way as a labyrinth gasket, so that a very good sealing effect against the exhaust gases is obtained. To simplify the installation of the shaft 21, in the region of the latter there is provided a split bearing plate 26 which is screwed to the housing 1 together with the housing ring 8.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Adjusting device for the throughput of exhaust gas through the turbine of an exhaust-gas turbocharger for an internal-combustion engine, the turbine having a double flow housing with two channels for supplying the exhaust gases to the turbine wheel, of which one channel can be closed off as a function of a variable operating parameter by means of a sliding sleeve which is mounted in the housing so as to be axially displaceable in the manner of a positive sliding fit by means of slot like longitudinal grooves in said sliding sleeve.

wherein the sliding sleeve is connected to an axially fixed and circumferentially rotatable driving ring via driving pins which engage into the longitudinal grooves arranged in the sliding sleeve and which drive these in the circumferential direction, wherein a slot pin fixed to the housing engages into a helical groove in the sliding sleeve, and wherein a shaft engages on the driving ring via a positive connection and is guided radially out of the housing via a bearing in the latter.

2. Device according to claim 1, wherein the bearing, is of ceramic material and the shaft is designed with a labyrinth gasket, into which a sealing ring is additionally inserted.

3. Device according to claim 1, wherein the positive connection is designed as a bevel wheel which is equipped with a toothing over some of its circumference and is fastened to the shaft and which engages into a bevel-wheel toothing formed laterally on the driving ring.

4. Device according to claim 2, wherein the positive connection is designed as a bevel wheel which is equipped with a toothing over some of its circumference and is fastened to the shaft and which engages into a bevel-wheel toothing formed laterally on the driving ring.

5. Device according to claim 1, wherein the driving ring is mounted on a housing ring inserted in the exhaust gas channel downstream of the turbine wheel and forming the channel wall, and the driving pins are inserted into the driving ring and engage into an outer encircling groove in the housing ring.

6. Device according to claim 5, wherein the driving pins inserted into the driving ring project outwards therefrom to engage into said longitudinal grooves of the sliding sleeve, thus forming the sliding fit.

7. Device according to claim 4, wherein the driving pins are inserted into the driving ring and projecting outwards therefrom to engage into said longitudinal grooves of the sliding sleeve, thus forming the sliding fit.

8. Device according to claim 3, wherein the driving pins are inserted into the driving ring and projecting outwards therefrom to engage into said longitudinal grooves of the sliding sleeve, thus forming the sliding fit.

9. Device according to claim 5, wherein the driving ring is mounted on the housing ring by means of ceramic bearing balls.

10. Device according to claim 8, wherein the driving ring is mounted on the housing ring by means of ceramic bearing balls.

11. Device according to claim 5, wherein adjacent to that end region of the housing ring located on the same side as the turbine wheel and connected firmly to said housing ring by means of retaining pins, a contour ring is provided which is matched to the outer edges of the turbine wheel and on which the sliding sleeve is additionally mounted.

12. Device according to claim 10, wherein adjacent to that end region of the housing ring located on the same side as the turbine wheel and connected firmly to said housing ring by means of retaining pins, a contour ring is provided which is matched to the outer edges of the turbine wheel and on which the sliding sleeve is additionally mounted.

13. Device according to claim 11, wherein the contour ring forms an inner track shoulder for the bearing balls on the side of the turbine wheel.

14. Device according to claim 12, wherein the contour ring forms an inner track shoulder for the bearing balls on the side of the turbine wheel.

* * * * *